(12) United States Patent
Lota

(10) Patent No.: US 10,099,576 B2
(45) Date of Patent: Oct. 16, 2018

(54) VEHICLE SEAT ADJUSTMENT SYSTEM

(71) Applicant: Toyota Motor Engineering & Manufacturing North America, Inc., Erlanger, KY (US)

(72) Inventor: Charan S. Lota, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 67 days.

(21) Appl. No.: 15/332,224

(22) Filed: Oct. 24, 2016

(65) Prior Publication Data

US 2018/0111511 A1    Apr. 26, 2018

(51) Int. Cl.
| | | |
|---|---|---|
| *G01C 21/10* | (2006.01) | |
| *G01C 21/30* | (2006.01) | |
| *G01C 21/32* | (2006.01) | |
| *B60N 2/02* | (2006.01) | |
| *B60N 2/06* | (2006.01) | |
| *B60N 2/22* | (2006.01) | |
| *B60R 1/00* | (2006.01) | |

(52) U.S. Cl.
CPC ......... *B60N 2/0244* (2013.01); *B60N 2/0232* (2013.01); *B60N 2/06* (2013.01); *B60N 2/062* (2013.01); *B60N 2/22* (2013.01); *B60R 1/00* (2013.01); *B60N 2002/0272* (2013.01); *B60R 2300/8006* (2013.01)

(58) Field of Classification Search
CPC ........ B60N 2/0232; B60N 2/06; B60N 2/062; B60N 2/22; B60R 1/00

USPC .......................................................... 701/409
See application file for complete search history.

(56) References Cited

U.S. PATENT DOCUMENTS

| | | | |
|---|---|---|---|
| 6,739,659 | B2 | 5/2004 | Dukes |
| 6,820,911 | B2 | 11/2004 | Furui |
| 8,260,506 | B2 | 9/2012 | Jungert et al. |
| 8,364,352 | B2 | 1/2013 | Mimura |
| 9,199,553 | B2 | 12/2015 | Cuddihy et al. |
| 2015/0367789 | A1 | 12/2015 | Drake et al. |
| 2017/0072816 | A1* | 3/2017 | Lippman .............. B60N 2/0244 |

FOREIGN PATENT DOCUMENTS

| | | | |
|---|---|---|---|
| DE | 102015010243 | A1 * | 4/2015 |
| DE | 102015010243 | A1 | 3/2016 |

* cited by examiner

*Primary Examiner* — Maceeh Anwari
(74) *Attorney, Agent, or Firm* — Dinsmore & Shohl LLP

(57) ABSTRACT

Vehicle seat adjustment systems including cameras are disclosed. The vehicle seat adjustment system includes a camera configured to capture a seat arrangement of a front seat of a vehicle and one or more seats behind the front seat, a screen, communicatively coupled to the camera, configured to display the seat arrangement captured by the camera, an input device configured to receive an input from a user for adjusting positions of the one or more seats, an actuator communicatively coupled to the input device and configured to adjust positions of the one or more seats, and a controller communicatively coupled to the camera, the screen, the input device and the actuator. The controller receives the input from the input device and instruct the actuator to adjust the positions of the one or more seats based on the input from the user.

19 Claims, 7 Drawing Sheets

VEHICLE SEAT ADJUSTMENT SYSTEM

TECHNICAL FIELD

The present specification generally relates to vehicle seat adjustment systems and, more specifically, to vehicle seat adjustment systems that adjust positions of one or more seats in a vehicle based on a seat arrangement image captured by an in-vehicle camera.

BACKGROUND

Positions of a driver seat and passenger seats in a vehicle can be adjusted, e.g., in a rearward direction or a forward direction. In a conventional seat adjustment system, a driver sitting on a driver seat may adjust the position of the seat either automatically (e.g., using an electric motor) or manually. However, in the conventional seat adjustment system, the driver cannot adjust the positions of seats behind her from the driver seat position. When the driver wants to adjust the position of a seat behind her while seating on the driver seat, she may need to move to the back seat of the vehicle and adjust the position of the seat to the desired position.

Accordingly, a need exists for vehicle seat adjustment systems that allow a person in the front seat(s) of a vehicle to safely adjust a seat behind the front seat(s).

SUMMARY

In one embodiment, a vehicle seat adjustment system may include a camera configured to capture a seat arrangement of a front seat of a vehicle and one or more seats behind the front seat, a screen communicatively coupled to the camera and configured to display the seat arrangement captured by the camera, an input device configured to receive an input from a user for adjusting positions of the one or more seats, an actuator communicatively coupled to the input device and configured to adjust positions of the one or more seats, and a controller communicatively coupled to the camera, the screen, the input device and the actuator. The controller may include at least one processor and at least one memory storing computer readable and executable instructions that, when executed by the processors, receive the input from the input device, and instruct the actuator to adjust the positions of the one or more seats based on the input.

In another embodiment, a method of adjusting positions of one or more seats located behind a first-row seat in a vehicle may include displaying, on a screen of the vehicle, a seat arrangement image captured by a camera attached within the vehicle, the seat arrangement image including the one or more seats. The method may further include receiving, from an input device located proximate to the first-row seat, a selection of a seat among the one or more seats and receiving, from the input device, an input for adjusting a position of the selected seat. The method may also include sending to an actuator an instruction for moving the selected seat based on the input.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2:
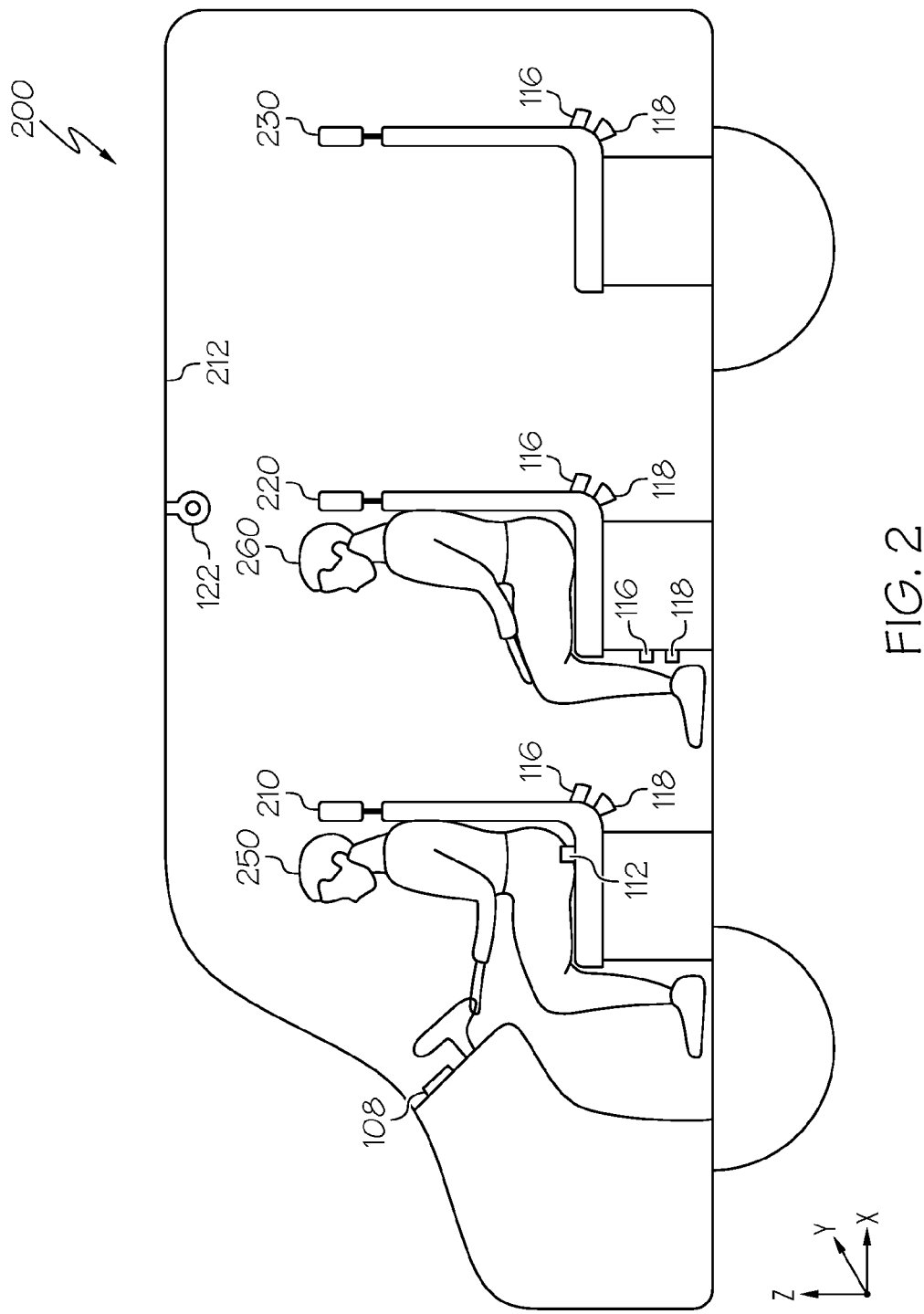
FIG. 2 schematically depicts a side view of a seat arrangement inside a vehicle according to one or more embodiments shown and described herein.

The embodiments disclosed herein include vehicle seat adjustment systems including one or more cameras. Referring generally to FIG. 2, a vehicle seat adjustment system includes a camera, a screen, and a tactile input hardware. The vehicle seat adjustment systems described herein may include a camera configured to capture a seat arrangement of a front seat of a vehicle and one or more seats behind the front seat, a screen communicatively coupled to the camera and configured to display the seat arrangement captured by the camera, an input device configured to receive an input from a user for adjusting positions of the one or more seats, an actuator configured to adjust positions of the one or more seats, and a controller communicatively coupled to the camera, the screen, the input device and the actuator. The controller may include at least one processor and at least one memory storing computer readable and executable instructions that, when executed by the processors, receive the input from the input device, and instruct the actuator to adjust the positions of the one or more seats based on the input. By displaying a current seat arrangement image on the screen, the vehicle seat adjustment systems described allow people in the first row seats to control the location and movement of seats behind the first row seats accurately and safely. Various embodiments of seat adjustment systems and methods of using seat adjustment systems will be described herein with specific reference to the appended drawings.

As used herein, the term "longitudinal direction" refers to the forward-rearward direction of the vehicle (i.e., in the +/−X-direction of the coordinate axes depicted in the figures). The term "lateral direction" refers to the cross-wise direction of the vehicle (i.e., in the +/−Y-direction of the coordinate axes depicted in the figures), and is transverse to the longitudinal direction. The term "vertical direction" refers to the upward-downward direction of the vehicle (i.e., in the +/−Z-direction of the coordinate axes depicted in the figures).

The term "seat arrangement," as used herein, refers to the relative orientation of some or all of the seats within the vehicle.

When a driver in the front seat wants to adjust the position of one or more seats behind her, she may not able to see and assess the seat arrangement for the rear seats of the vehicle to, for example, determine the current positions of the seats, or identify any objects present between seats. The embodiments described herein mitigate this difficulty by providing vehicle seat adjustment systems and methods for adjusting the seats of a vehicle using a displayed seat arrangement captured by a camera in real time.

Figure 1:
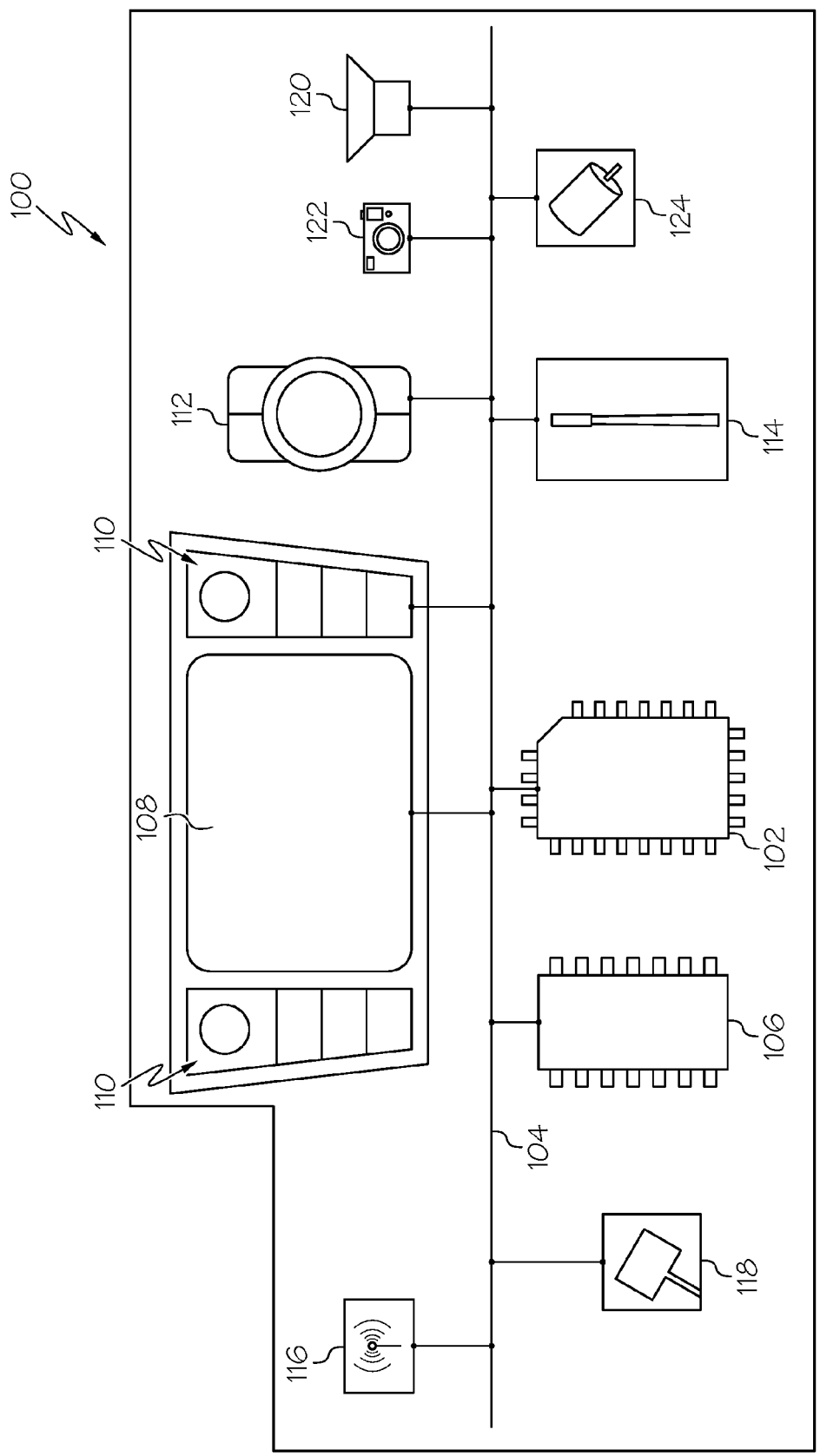
FIG. 1 schematically depicts a vehicle seat adjustment system according to one or more embodiments shown and described herein.

Referring now to FIG. 1, an embodiment of a vehicle seat adjustment system 100 is schematically depicted. It is noted that, while the vehicle seat adjustment system 100 is depicted in isolation, the vehicle seat adjustment system 100 may be included within a vehicle, for example, within the vehicle 200 of FIG. 2. In embodiments in which the vehicle seat adjustment system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the vehicle seat adjustment system 100 may be embodied within a mobile device (e.g., smartphone, laptop computer, etc.) carried by an occupant of the vehicle.

Still referring to FIG. 1, the vehicle seat adjustment system 100 includes one or more processors 102. Each of the one or more processors 102 may be any device capable of executing machine readable instructions. For example, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, it should be understood that the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. In embodiments, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle seat adjustment system 100 further includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The one or more memory modules 106 may be non-transient memory modules. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes information on seat arrangement settings. For example, the database may include default positions of the seats in a vehicle. The database may also include customized positions of the seats in a vehicle set by a user.

Referring still to FIG. 1, the vehicle seat adjustment system 100 comprises a screen 108 for providing visual output such as, for example, maps, navigation, entertainment, seat arrangements or a combination thereof. The screen 108 may be located on the head unit of the vehicle such that a driver of the vehicle may easily see the screen 108 while seated in the driver seat. For example, as shown in FIG. 2, a driver 250 may see the screen 108 while being in the front seat 210. The screen 108 may output one of map, navigation, entertainment, and seat arrangement data in response to a selection of a corresponding function. The screen 108 is coupled to the communication path 104. Accordingly, the communication path 104 communicatively couples the screen 108 to other modules of the vehicle seat adjustment system 100 including, without limitation, the one or more processors 102 and/or the one or more memory modules 106. The screen 108 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 108 may be a touchscreen that, in addition to visually displaying information, detects the presence and location of a tactile input upon a surface of or adjacent to the screen 108. Accordingly, each display may receive mechanical (e.g., touch) input directly upon the optical output provided by the screen. Additionally, it is noted that the screen 108 can include at least one of the one or more processors 102 and at least one of the one or memory modules 106.

The depicted vehicle seat adjustment system 100 comprises tactile input hardware 110 coupled to the communication path 104 such that the communication path 104 communicatively couples the tactile input hardware 110 to other modules of the vehicle seat adjustment system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted over the communication path 104 such as, for example, a button, a switch, a knob, a microphone or the like. In some embodiments, the screen 108 and the tactile input hardware 110 are combined as a single module and operate as an audio head unit or an infotainment system. However, it is noted, that the screen 108 and the tactile input hardware 110 may be separate from one another and operate as a single module by exchanging signals via the communication path 104. The tactile input hardware 110 may include a plurality of buttons or knobs for adjusting positions of one or more seats in a vehicle as will be described in association with FIGS. 3A-3B, 4A-4D, 5A-5B, and 6A-6B. In other embodiments, the vehicle seat adjustment system 100 may not include the tactile input hardware. Instead, the vehicle seat adjustment system 100 may include soft keys whose function changes depending on the context.

The vehicle seat adjustment system 100 may optionally comprise a peripheral tactile input 112 coupled to the communication path 104 such that the communication path 104 communicatively couples the peripheral tactile input 112 to other modules of the vehicle seat adjustment system 100. In embodiments, the peripheral tactile input 112 may be located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104. In other embodiments, the peripheral tactile input 112 may be located at the side of a front-row seat, e.g., a driver seat such that a driver can manipulate while driving. For example, the driver presses or touches the peripheral tactile input 112 to adjust the position of a seat in the vehicle. Specifically, the peripheral tactile input 112 may be a knob, and if the driver rotates the knob clockwise, a seat behind her moves in one direction, and if the driver rotates the knob counterclockwise, the seat behind her moves in another direction. In another example, the peripheral tactile input 112 may include a plurality of buttons, such as directional arrows or button, similar to the tactile input hardware 110 such that the driver can adjust the positions of seats by manipulating the plurality of buttons.

In embodiments, the vehicle seat adjustment system 100 comprises a satellite antenna 114 coupled to the communication path 104 such that the communication path 104 communicatively couples the satellite antenna 114 to other modules of the vehicle seat adjustment system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the vehicle seat adjustment system 100 does not include the satellite antenna 114.

Still referring to FIG. 1, the vehicle seat adjustment system 100 may further comprise a proximity sensor 116. The proximity sensor 116 is coupled to the communication path 104 such that the communication path 104 communicatively couples the proximity sensor 116 to other modules of the vehicle seat adjustment system 100. The proximity sensor 116 detects a distance between the proximity sensor 116 and an object nearby and communicates the proximity information to the one or more processors 102. The proximity sensor 116 may be any device capable of outputting a proximity signal indicative of a distance of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. The proximity sensor 116 may be located at the back of a seat to detect an object behind the seat as shown in FIG. 2. In another example, the proximity sensor 116 may be located on a seatback or a seating surface of a seat to detect if an object is in that seat. In yet another example, the proximity sensor 116 may be located at the side of the seat (+/−y direction). In some embodiments, the vehicle seat adjustment system 100 may be configured to determine the presence of an object on a seat of a vehicle based on an output signal output from the proximity sensor. In some embodiments, the vehicle seat adjustment system 100 may be able to determine one or more characteristics of an object on the seat, such as, for example, the dimensions of the object (height, width, diameter, or the like) based on a proximity signal outputted by the proximity sensor. The characteristic information may be used to determine whether a person is seated on a seat, and/or the height of the person in the seat. The determined information may be displayed on the screen 108. In some embodiments the vehicle seat adjustment system 100 may not include the proximity sensor.

Still referring to FIG. 1, the vehicle seat adjustment system 100 may further comprise a pressure sensor 118. The pressure sensor 118 is coupled to the communication path 104 such that the communication path 104 communicatively couples the pressure sensor 118 to other modules of the vehicle seat adjustment system 100. The pressure sensor 118 may be a force collector type sensor which measures strain due to force applied over an area. The pressure sensor 118 may be a strain sensor, a pressure transducer, a piezo-electric sensor or the like. The pressure sensor 118, similar to the proximity sensor 116, may be located at the back of a seat to detect an object pushing against the seat as shown in FIG. 2. The pressure sensor 118 detects a pressure applied against the pressure sensor 118 by an object behind the seat. For example, when a second row seat 220 moves towards a first row seat 210 in FIG. 2, the pressure sensor 118 detects a pressure applied by the leg of a passenger 260. The pressure sensor 118 may be also used to detect the presence of an object in the seat. For example, the pressure sensor 118 may be located on a seatback or a seating surface of a seat to detect if an object is present in the seat. In some embodiments the vehicle seat adjustment system 100 may not include the pressure sensor.

The vehicle seat adjustment system 100 may further comprise a speaker 120 coupled to the communication path 104 such that the communication path 104 communicatively couples the speaker 120 to other modules of the vehicle seat adjustment system 100. The speaker 120 transforms data signals from the vehicle seat adjustment system 100 into audible mechanical vibrations. The speaker 120 may provide information to an occupant of the vehicle seat adjustment system 100 about adjustment of one or more seats in the vehicle. For example, the speaker 120 may provide an alarm to the occupant when one of the seats in the vehicle is being adjusted. In another example, the speaker 120 may provide an alarm to the occupant when an object is detected in a path along which a seat is moving. In yet another example, the speaker 120 may provide an alarm to the occupant when the pressure sensor 118 detects a pressure by an object. The speaker 120 may provide different kinds of alarms depending on the type of detection.

Still referring to FIG. 1, the vehicle seat adjustment system 100 may further comprise one or more cameras 122. Each of the one or more cameras 122 is coupled to the communication path 104 and communicatively coupled to the one or more processors 102. Each of the one or more cameras 122 may be any device having an array of sensing devices capable of detecting radiation in an ultraviolet wavelength band, a visible light wavelength band, or an infrared wavelength band. In embodiments, the one or more cameras 122 may be an omni-directional camera, or a panoramic camera, for example. In some embodiments, one or more optical components, such as a mirror, fish-eye lens, or the like, may be optically coupled to at least one of the one or more cameras 122. The fish-eye lens may provide an image of the environment with a field-of-view of approximately 180 degrees. In some embodiments, a mirror may be used in conjunction with the camera to capture an image of otherwise obscured locations by directing light from the obscured locations into the camera. The one or more cameras 122 may be used to capture an image of a seat arrangement inside the vehicle.

Figure 3A:
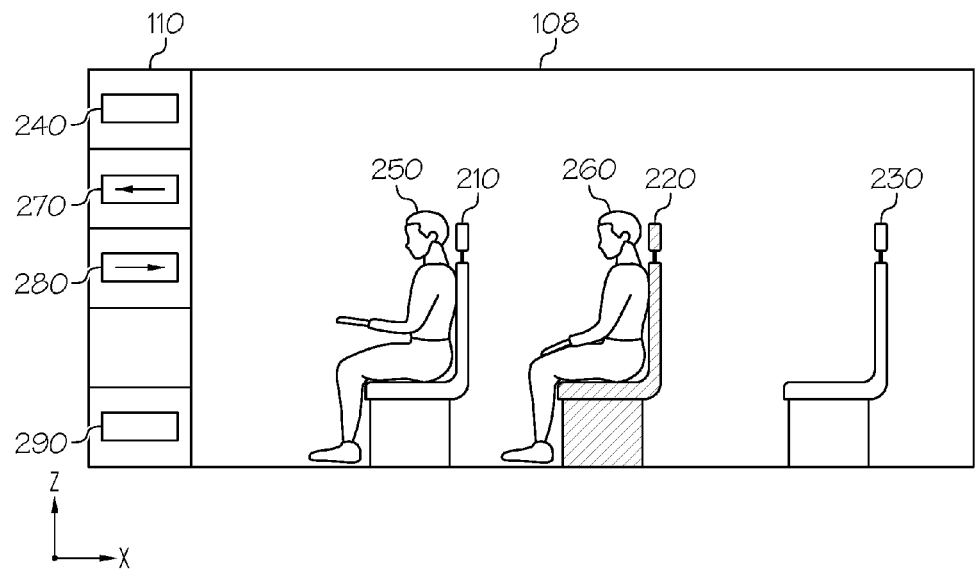
FIG. 3A depicts a vehicle screen showing a schematic side view of a seat arrangement captured by a camera according to one or more embodiments shown and described herein.
Figure 3B:
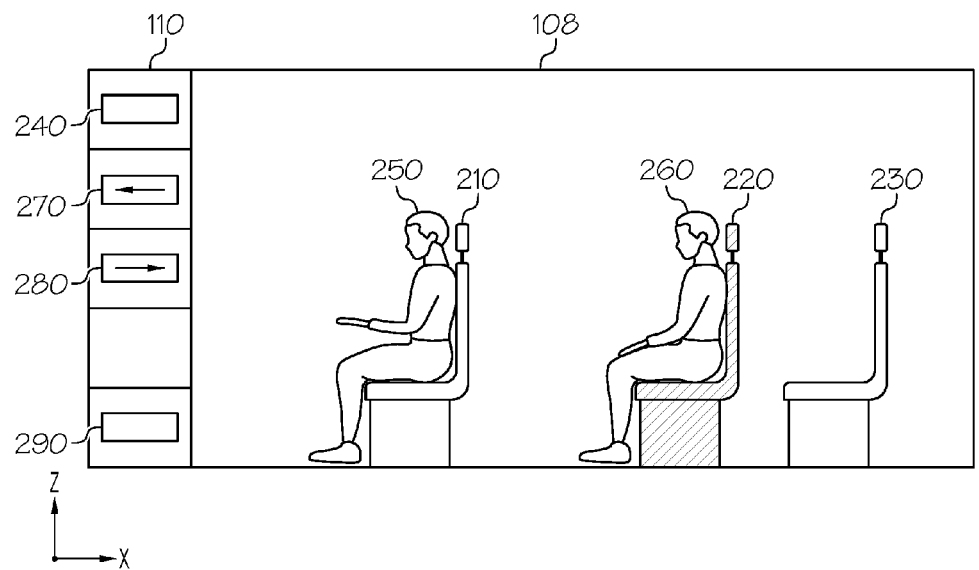
FIG. 3B depicts a vehicle screen showing a schematic side view of a seat arrangement captured by a camera according to one or more embodiments of the present disclosure.
Figure 4A:
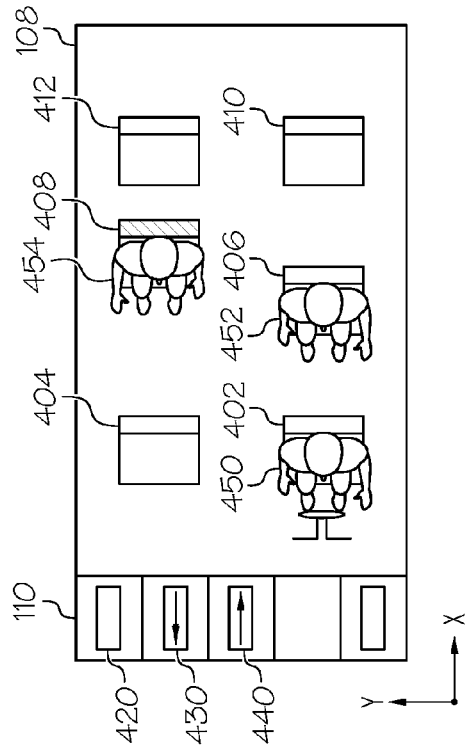
FIG. 4A depicts a vehicle screen showing a schematic top view of a seat arrangement captured by a camera according to one or more embodiments shown and described herein.

In embodiments, the one or more cameras 122 may be located in the interior of the vehicle and oriented to capture a side view of seats in the vehicle, for example, as shown in FIGS. 3A and 3B. For example, a camera may be attached to an interior of one of the doors of a vehicle to capture a side view of seats. In another example, a camera may be attached to an interior of one of the passenger windows of a vehicle to capture a side view of seats. In yet another example, a camera may be attached to an interior of a side wall of the vehicle to capture a side view of seats. In yet another example, a camera may be attached to an interior roof of the vehicle and a mirror may be attached to one of the passenger windows or one of the doors such that the camera can capture a side view of seats through the mirror. Alternatively or additionally, the one or more cameras 122 may be located in a vehicle to capture a top view of seats in the vehicle, for example, as shown in FIGS. 4A and 4B. Each of the one or more cameras 122 may include a processor for processing the captured image. For example, the processor of the camera 122 may process the captured image to distinguish the body of the vehicle from external objects such as human, pets, and other objects that are not integrated to the vehicle. In another example, the camera 122 may send the captured image to the one or more processors 102 and the one or more processors 102 process the received image to distinguish the body of the vehicle from external objects. In some embodiments, more than one camera may capture images of a seat arrangement inside the vehicle respectively and send the images to the one or more processors 102, which then process the images to create an integrated image, for example, a two-dimensional or three-dimensional image of the seat arrangement.

Still referring to FIG. 1, the vehicle seat adjustment system 100 may further comprise one or more actuators 124. Each of the one or more actuators 124 is coupled to the communication path 104 and communicatively coupled to the one or more processors 102. The one or more actuators 124 may be electric motors for moving seats in the vehicle in the longitudinal, lateral or vertical direction, as is conventional in passenger vehicles. In some embodiments, at least one of the one or more actuators 124 may be operated to move a second row seat of the vehicle, and at least another actuator may be operated to move a third row seat of the vehicle. In some embodiments, at least one of the one or more actuators may be operated to fold or unfold seats in the vehicle. In other embodiments, at least one of the one or more actuators may be operated to change the angular orientation of the seatback of a seat with respect to the seating surface of the seat in the vehicle.

Still referring to FIG. 1, in embodiments, the vehicle seat adjustment system 100 can be formed from a plurality of modular units, i.e., the screen 108, the tactile input hardware 110, the peripheral tactile input 112, one or more cameras 122 and one or more actuators 124, can be formed as modules communicatively coupled to one another to form the vehicle seat adjustment system 100. Accordingly, in some embodiments, each of the modules can include at least one of the one or more processors 102 and/or the one or more memory modules 106. It is noted that, while specific modules may be described herein as including a processor 102 and/or a memory module 106, the embodiments described herein can be implemented with the processors 102 and memory modules 106 distributed throughout various communicatively coupled modules.

FIG. 2 schematically depicts a seat arrangement inside a vehicle according to one or more of embodiments shown and described herein. In embodiments, the vehicle 200 may include three rows of seats including a first row seat 210, a second row seat 220, and a third row seat 230. In the embodiment depicted in FIG. 2, a driver 250 is seated in the first row seat 210 and a passenger 260 is seated in the second row seat 220. Each of the first row seat 210, the second row seat 220, and the third row seat may be moved by corresponding actuators 124 in the longitudinal, lateral, or vertical direction.

Each of the first row seat 210, the second row seat 220, and the third row seat 230 may include the proximity sensor 116 and the pressure sensor 118. As shown in FIG. 2, the proximity sensor 116 and the pressure sensor 118 may be positioned at the back of each seat. In other embodiments, the proximity sensor 116 and the pressure sensor 118 may be located at the front bottom of each seat, for example, proximate to an ankle of a passenger when seated in the seat. The proximity sensor 116 may detect an object nearby, for example, the passenger 260 on the second row seat 220. The pressure sensor 118 may detect a force against the pressure sensor. For example, the pressure sensor 118 may detect a pressure by the passenger 260 against the pressure sensor 118 when the second row seat 220 moves in a longitudinal direction and the leg of the passenger 260 touches the pressure sensor 118. Signals from the proximity sensor 116 and the pressure sensor 118 may be transmitted to the one or more processors 102. Then, the processors 102 may control the operation of the actuator 124 of the corresponding seat based on the received signals. For example, the processors 102 may instruct the actuator 124 to limit or reduce the movement of the first row seat 210, the second row seat 220, or the third row seat 230 when the pressure sensor 118 detects a pressure, or the proximity sensor 116 detects an object within a predetermined distance.

In some embodiments, when the passenger 260 is in the second row seat 220, and the actuator 124 moves the second row seat 220 in a longitudinal direction as shown in FIGS. 3A and 3B, the current in the actuator 124 increases when the second row seat 220 contacts an object (e.g., a leg of an occupant seated behind the second row seat). The one or more processors 102 may determine that an object is present behind the second row seat 220 based on the increase in the current of the actuator 124.

In embodiments, the camera 122 may be attached to the interior of the roof 212 of the vehicle 200 and capture an image of a seat arrangement inside the vehicle 200. For example, the camera 122 may capture a view of the first row seat 210, the second row seat 220, and the third row seat 230 from an oblique viewpoint (e.g., +45 degree from +y axis) while being attached to the roof 212. Then, the captured image may processed by the one or more processors 102 to a side view of the seat arraignment. In another example, the camera 122 may be attached to the interior of the roof 212 of the vehicle and a mirror is attached to an interior of one of the windows or an interior of one of the doors of the vehicle such that the camera can capture a side view of the seats from the light reflected by the mirror. In some embodiments, the camera 122 may capture a top view of the first row seat 210, the second row seat 220, and the third row seat 230. Although FIG. 2 depicts the camera 122 attached to the interior of the roof of the vehicle 200, it should be understood that the camera 122 may be attached to any location of the vehicle suitable for capturing an image of the seat arrangement. In embodiments, more than one camera 122 may be attached within the vehicle 200, and images captured by more than one cameras 122 may be synthesized or processed by the one or more processors 102 to prepare a three-dimensional view of the seat arrangement.

The image captured by the camera 122 may be transmitted to the one or more processors 102. The one or more processors 102 may process the image and send it to the screen 108. Then, the screen 108 may display the processed image such that the driver 250 may see the current seat arrangement. Various seat arrangements displayed on the screen 108 will be described with reference to FIGS. 3A-3B, 4A-4D, 5A-5B, and 6A-6B. In some embodiments, the one or more processors 102 may determine whether the transmission of the vehicle is in park, or the vehicle is traveling at a speed below a certain threshold value. If the transmission of the vehicle is in neutral, or is driving below a certain value, then the one or more processors 102 may allow the screen 108 to display the image captured by the camera.

In embodiments, the first row seat 210 may include the peripheral tactile input 112 to receive input from the driver 250. For example, if the driver 250 wants to adjust the position of at least one of the second row seat 220 and the third row seat 230, she can activate the peripheral tactile input 112. The peripheral tactile input 112 may include several buttons. For example, the peripheral tactile input 112 may include at least one of a button for selecting a seat to adjust, a button for moving a selected seat in a longitudinal direction, a button for moving a selected seat in a lateral direction, a button for moving a selected seat in a vertical direction, a button for reclining a selected seat, and a button for folding a selected seat. In some embodiments, the peripheral tactile input 112 may include a joystick which allows a user to move a selected seat in a direction corresponding to an orientation of the joystick operated by the user. In other embodiments, the peripheral tactile input 112 may be a touch screen including a seat adjustment interface which allows a user to adjust the position of a selected seat.

FIGS. 3A-3B depict the screen 108 showing an image captured by a camera according to one or more embodiments shown and described herein. The image shown in FIGS. 3A-3B is one embodiment of the present disclosure. However, it should be understood that different images from different perspective may be displayed on the screen 108. For example, an image of seats and passengers taken from an angle (e.g., +45 degree angle from +y axis) may be shown on the screen 108. In another example, a three-dimensional image of seats and passengers may be displayed on the screen 118, which may be prepared by processing multiple images taken by multiple cameras. The screen 108 may start displaying the captured image in response to a driver activating the tactile input hardware 110 or peripheral tactile input 112. In other embodiments, the screen 108 may start displaying the captured image when an object is present on the second row seat 220 or the third row seat 230 before or after motion of a seat according to a driver's instruction. The one or more processors 102 may determine that an object is present in a seat by processing the image captured by the camera 122 or by a signal from the proximity sensor 116.

The tactile input hardware 110 may include a plurality of input buttons: a seat selection button 240, seat movement buttons 270 and 280, and a seat adjustment mode button 290. Although the plurality of input buttons are located in certain positions in FIG. 3A, it should be understood that the plurality of input buttons may be located in various other positions. In embodiments, each of the plurality of input buttons may be a physical knob that can be pressed upon and/or rotated, or an animated control knob displayed on a screen that can be activated and manipulated by touch. In other embodiments, each of the plurality of input buttons may be configured to rotate around a center of each of the plurality of input buttons to receive an analog or digital scale input.

In embodiments, the driver 250 may press the seat adjustment mode button 290 to initiate seat adjustment. For example, the screen 108 may initiate displaying a seat arrangement image captured by the camera 122 in response to the press of the seat adjustment mode button 290. The screen may return to a previous display mode (e.g., a navigation mode, a media mode, etc.) when the driver 250 presses the seat adjustment mode button again. In other embodiments, the screen may return to a previous display mode (e.g., a navigation mode, a media mode, etc.) after a predetermined period of non-operation on the tactile input hardware 110.

In embodiments, the driver 250 may select a seat to adjust by pressing or touching the seat selection button 240. For example, when the driver 250 presses or touches the seat selection button 240, the second row seat 220 may be selected to be adjusted. The second row seat 220 on the screen 108 may be highlighted to indicate the seat currently being adjusted as shown in FIG. 3A. When the driver 250 presses or touches the seat selection button 240 again, the third row seat 230 may be selected and the third row seat 230 may be highlighted accordingly.

In embodiments, the driver 250 may adjust the position of the selected seat by manipulating the seat movement buttons. For example, when the driver 250 presses or touches the seat movement button 270 while the second row seat 220 is selected, the one or more processors 102 instruct the actuator 124 to move the second row seat 220, and the second row seat 220 is moved by the actuator 124 in a (−x) longitudinal direction. Similarly, when the driver 250 presses or touches the seat movement button 280 while the second row seat 220 is selected, the one or more processors 102 instruct the actuator 124 to move the second row seat 220, and the second row seat 220 is moved by the actuator 124 in a (+x) longitudinal direction. The screen 108 may continue to show a real-time image captured by the camera 122 as the second row seat 220 is moved in the desired direction. The real-time image may show the driver 250 how much room is available to move the seat rearward or forward in real time. In addition, the driver 250 can accurately adjust seats by monitoring the real-time image on the screen 108. For example, in response to the operation of the seat movement button 280, the second row seat 220 moves in a (+x) longitudinal direction, and the real-time image is displayed on the screen 108, as shown in FIG. 3B, as the seat is moved. When the driver 250 finds, through the screen 108, an appropriate space is obtained between the first row seat 210 and the second row seat 220, she can stop the operation of the seat movement.

In other embodiments, the tactile input hardware 110 may include a single seat movement button. For example, the single seat movement button may be an input button configured to rotate around a center of the button to send an analog or digital scale input. When the driver 250 rotates the single seat movement button clockwise, the one or more processors 102 instruct the actuator 124 to move a selected seat in a (+x) longitudinal direction, and the selected seat is moved by the actuator 124 in a (+x) longitudinal direction. When the driver 250 rotates the single seat movement button counterclockwise, the one or more processors 102 instruct the actuator 124 to move a selected seat in a (−x) longitudinal direction, and the selected seat is moved by the actuator 124 in a (−x) longitudinal direction.

In embodiments, the selected seat continues to move while one of the seat movement buttons 270 and 280 is being pressed or touched and stops moving when one of the seat movement buttons 270 and 280 is released. In other embodiments, the selected seat continues to move when one of the movement buttons 270 and 280 is pressed for a predetermined time (e.g., 0.5 second) until the proximity sensor 116 detects an object within a predetermined distance or the pressure sensor 118 detects a certain degree of pressure.

In other embodiments, two or more seats may be selected at the same time. For example, the driver 250 may touch the second row seat 220 and the third row seat 230 on the screen 108 to select both seats. Then, when the driver 250 presses or touches the seat movement button 270 while both the second row seat 220 and the third row seat 230 are selected, the one or more processors 102 instruct corresponding actuators 124 to move both the second row seat 220 and the third row seat 230 simultaneously, and the second row seat 220 and the third row seat 230 are simultaneously moved by the actuators 124 in a (−x) longitudinal direction. Similarly, when the driver 250 presses or touches the seat movement button 280 while the second row seat 220 and the third row seat 230 are selected, the one or more processors 102 instruct corresponding actuators 124 to move the second row seat 220 and the third row seat 230, and the second row seat 220 and the third row seat 230 are simultaneously moved by the actuator 124 in a (+x) longitudinal direction.

Figure 4C:
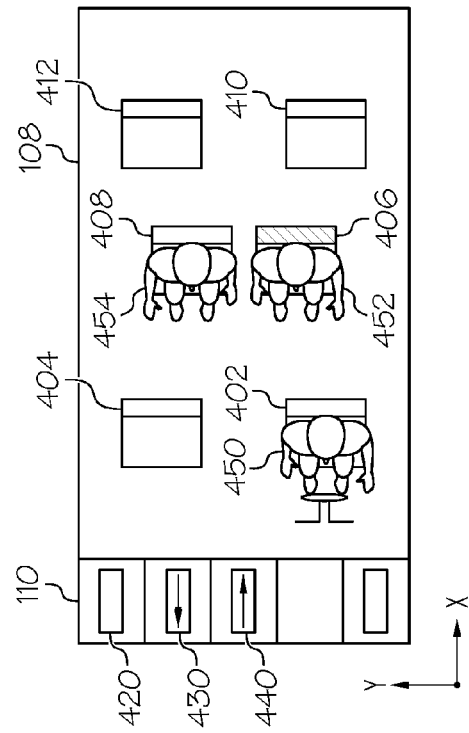
FIG. 4C depicts a vehicle screen showing a schematic top view of a seat arrangement captured by a camera according to one or more embodiments shown and described herein.
Figure 4B:
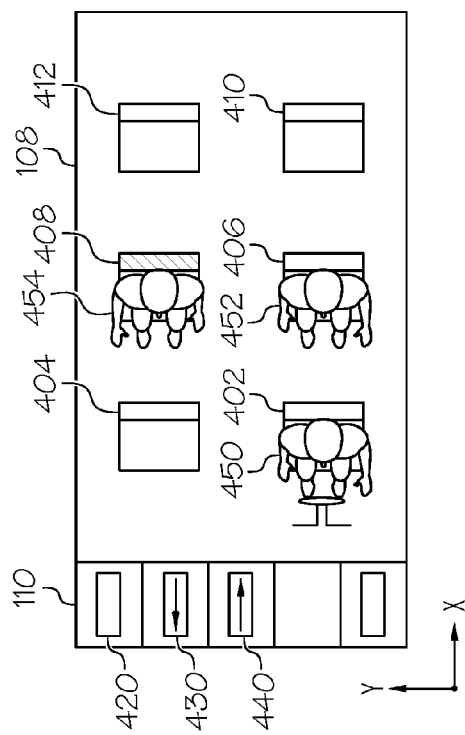
FIG. 4B depicts a vehicle screen showing a schematic top view of a seat arrangement captured by a camera according to one or more embodiments shown and described herein.

FIGS. 4A-4D depict the screen 108 showing a top view of the seat arrangement captured by a camera according to one or more embodiments shown and described herein. It should be understood that the image shown in FIGS. 4A-4D is one embodiment of the present disclosure, and that different images from different perspectives may be displayed on the screen 108. For example, an image of seats and passengers taken from an angle (e.g., +45 degree angle from +y axis) may be shown on the screen 108. In another example, a three-dimensional image of seats and passengers may be displayed on the screen 118, which may be prepared by processing multiple images taken by multiple cameras. The captured image includes six seats 402, 404, 406, 408, 410, and 412, a driver 450 seating on the seat 402, a passenger 452 seating on the seat 406, and a passenger 454 seating on the seat 408. The tactile input hardware 110 may include a plurality of input buttons: a seat selection button 420, and seat movement buttons 430 and 440. In embodiments, the driver 450 may select a seat to adjust by pressing or touching the seat selection button 420. The seat 408 may be selected by the driver 450 and highlighted as shown in FIG. 4A. When the driver 450 presses or touches the seat selection button 420 again, the next seat such as the seat 406 may be selected and the seat 406 may be highlighted as shown in FIG. 4C.

In embodiments, the driver 450 may adjust the position of the selected seat in a longitudinal direction by manipulating the seat movement buttons 430 and 440. For example, when the driver 450 presses or touches the seat movement button 430 while the seat 408 is selected, the one or more processors 102 instruct the actuator 124 to move the seat 408, and the seat 408 is moved by the actuator 124 in a (−x) longitudinal direction. Similarly, when the driver 450 presses or touches the seat movement button 440 while the seat 408 is selected, the one or more processors 102 instruct the actuator 124 to move the seat 408, and the seat 408 is moved by the actuator 124 in a (+x) longitudinal direction. The screen 108 may continue to show a real-time image captured by the camera 122 as the seat moves in the desired direction. For example, in response to the operation of the seat movement button 440, the seat 408 moves in a (+x) longitudinal direction, and the real-time image is displayed on the screen 108 as shown in FIG. 4B.

Figure 4D:
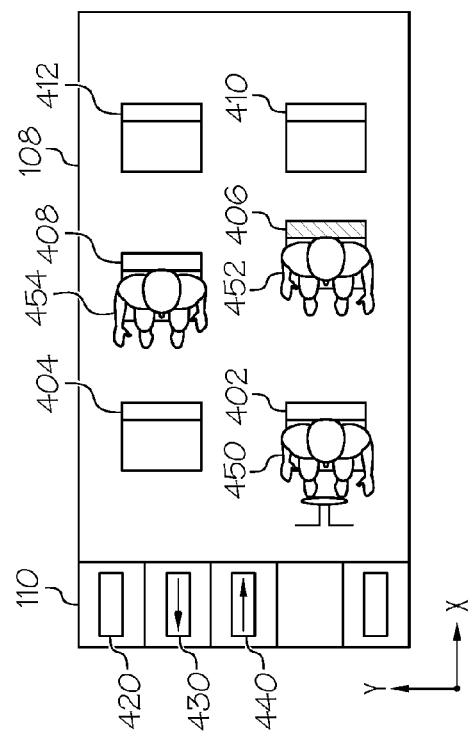
FIG. 4D depicts a vehicle screen showing a schematic top view of a seat arrangement captured by a camera according to one or more embodiments shown and described herein.

In other embodiments, the driver 450 may adjust the position of the selected seat in a lateral direction by manipulating the seat movement buttons 430 and 440. For example, when the driver 450 presses or touches the seat movement button 430 while the seat 408 is selected, the one or more processors 102 instruct the actuator 124 to move the seat 408, and the seat 408 is moved by the actuator 124 in a (−y) lateral direction. Similarly, when the driver 450 presses or touches the seat movement button 440 while the seat 406 is selected, the one or more processors 102 instruct the actuator 124 to move the seat 406, and the seat 406 is moved by the actuator 124 in a (+y) lateral direction. The screen 108 may continue to show a real-time image captured by the camera 122 as the seat is moved in the desired direction. For example, in response to the operation of the seat movement button 440, the seat 406 moves in a (+y) lateral direction, and the real-time image is displayed on the screen 108 as shown in FIG. 4D. The proximity sensor 116 or the pressure sensor 118 located at the side of the selected seat may detect an object proximate to the selected seat when the selected seat moves in a lateral direction. For example, the proximity sensor 116 or the pressure sensor 118 may be located at the side of the seatback of the selected seat. If the proximity sensor 116 or the pressure sensor 118 detects an object nearby, it sends a signal to the one or more processors 102 and the one or more processors may prevent the actuator 124 from moving the selected seat in a lateral direction.

In some embodiments, when the passenger 454 is in the seat 408, and the actuator 124 moves the seat 408 in a lateral direction as shown in FIG. 4D, the current in the actuator 124 increases when the seat 408 contacts an object present at the side of the seat 408. The one or more processors 102 may determine that an object is present at the side of the seat 408 based on the increase in the current of the actuator 124.

Figure 5A:
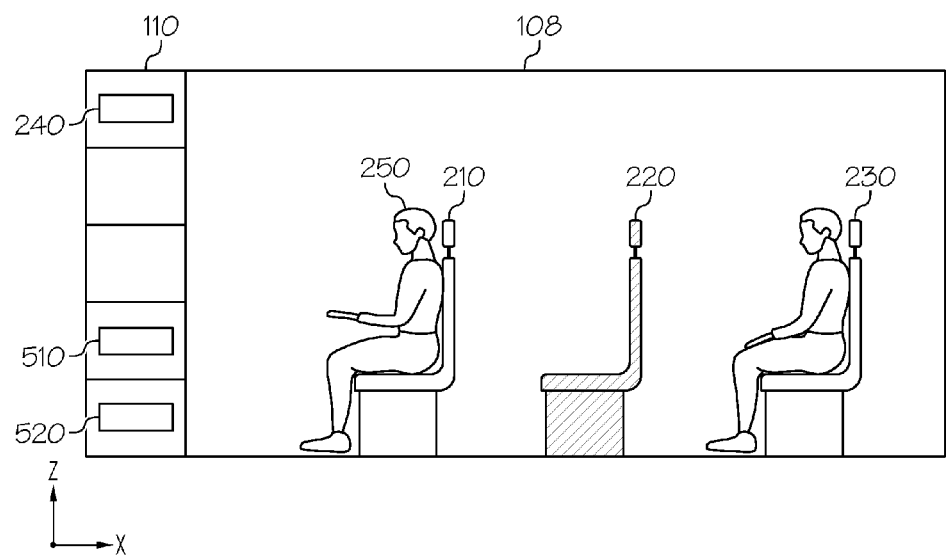
FIG. 5A depicts a vehicle screen showing a schematic side view of a seat arrangement captured by a camera according to one or more embodiments shown and described herein.
Figure 5B:
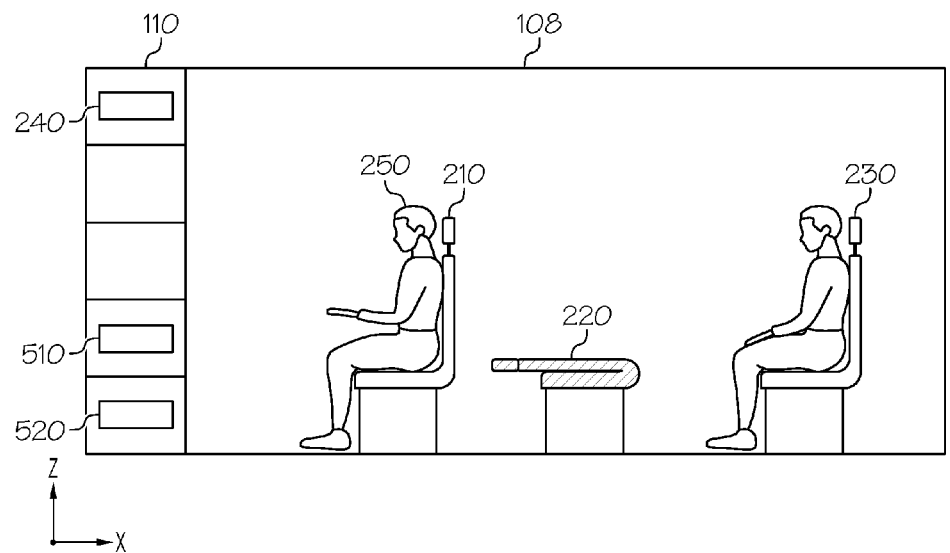
FIG. 5B depicts a vehicle screen showing a schematic side view of a seat arrangement captured by a camera according to one or more embodiments shown and described herein.

FIGS. 5A-5B depict the screen 108 showing a side view of a seat arrangement captured by a camera according to one or more embodiments shown and described herein. The tactile input hardware 110 may include a plurality of input buttons: a seat selection button 240, a seat folding button 510, and a seat unfolding button 520. In embodiments, the driver 250 may select a seat to fold or unfold by pressing or touching the seat selection button 240. For example, when the driver 250 presses or touches the seat selection button 240, the second row seat 220 may be selected to be adjusted. The second row seat 220 on the screen 108 may be highlighted to indicate the seat currently being adjusted as shown in FIG. 5A. When the driver 250 presses or touches the seat selection button 240 again, the third row seat 230 may be selected and the third row seat 230 may be highlighted accordingly.

In embodiments, the driver 250 may fold or unfold the selected seat by manipulating the seat folding button 510 or the seat unfolding button 520. For example, when the driver 250 presses or touches the seat folding button 510 while the second row seat 220 is selected, the one or more processors 102 instruct the actuator 124 to fold the second row seat 220, and the second row seat 220 is folded by the actuator 124. Similarly, when the driver 250 presses or touches the seat unfolding button 520 while the second row seat 220 is selected, the one or more processors 102 instruct the actuator 124 to unfold the second row seat 220, and the second row seat 220 is unfolded by the actuator 124. The screen 108 may continue to show a real-time image captured by the camera 122 as the seat is folded or unfolded. For example, in response to the operation of the seat folding button 510, the second row seat 220 is folded, and the real-time image is displayed on the screen 108 as shown in FIG. 5B.

The folding operation by the actuator 124 may be disabled when an object is detected on the selected seat. In embodiments, an object may be detected by processing the image captured by the camera 122 and distinguishing seats or other components integrated inside the vehicle from external objects. In other embodiments, an object may be detected by the proximity sensor 116 or the pressure sensor 118. When an object is detected on the selected seat, the speaker 120 of the vehicle may provide an alarm sound in response to the press of the seat folding button 510. In other embodiments, the folding operation is stopped based on an increase in the load of the actuator 124. For example, when an object is present in a seat, the current in the actuator 124 increases when the actuator 124 initiates the folding operation. When the increase in the current is detected by the one or more processors 102, the one or more processors 102 may stop the folding operation and return the seat to its initial position.

Figure 6A:
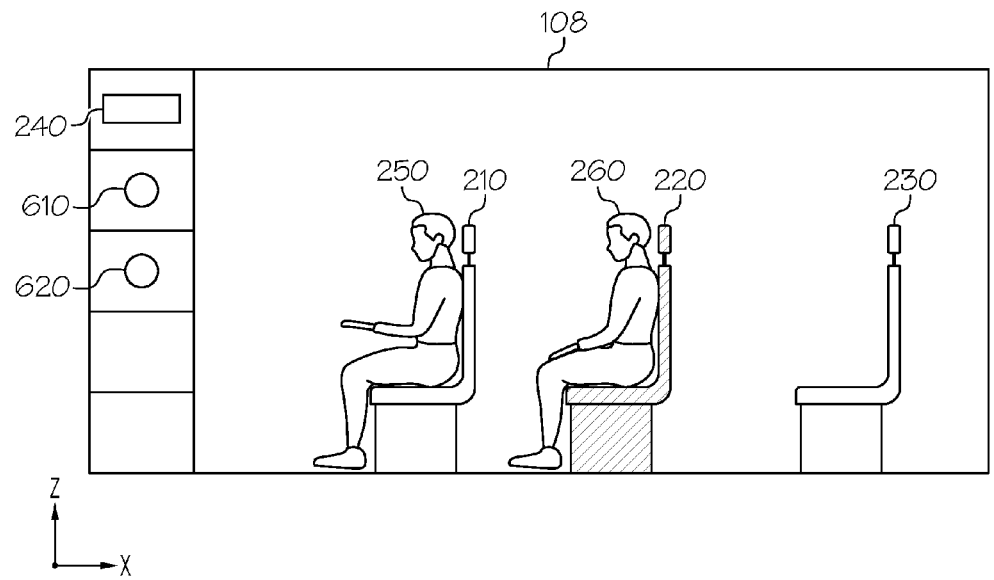
FIG. 6A depicts a vehicle screen showing a schematic side view of a seat arrangement captured by a camera according to one or more embodiments shown and described herein.
Figure 6B:
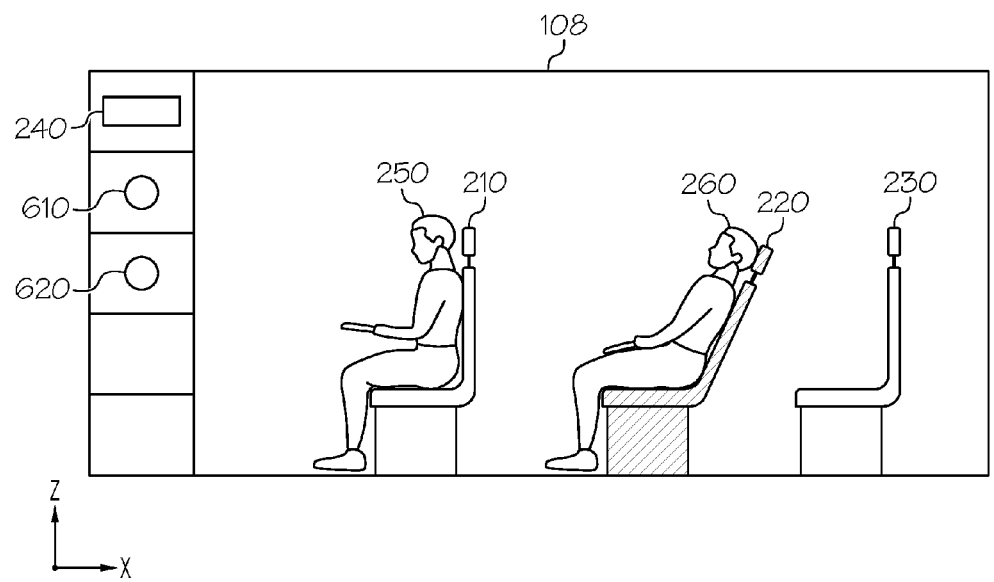
FIG. 6B depicts a vehicle screen showing a schematic side view of a seat arrangement captured by a camera according to one or more embodiments shown and described herein.

FIGS. 6A-6B depict the screen 108 showing a side view of a seat arrangement captured by a camera according to one or more embodiments shown and described herein. The tactile input hardware 110 may include a plurality of input buttons: a seat selection button 240, a seat reclining button 610, and a seat reclining button 620. In embodiments, the driver 250 may change the angular orientation of the seatback of a seat with respect to the seating surface of the seat by pressing or touching the seat selection button 240. For example, when the driver 250 presses or touches the seat selection button 240, the second row seat 220 may be selected for adjustment. The second row seat 220 on the screen 108 may be highlighted to indicate the seat currently being adjusted as shown in FIG. 6A. When the driver 250 presses or touches the seat selection button 240 again, the third row seat 230 may be selected and the third row seat 230 may be highlighted accordingly.

In embodiments, the driver 250 may change an angular orientation of a seatback of the selected seat by manipulating the seat reclining button 610 or the seat reclining button 620. For example, when the driver 250 presses or touches the seat reclining button 610 while the second row seat 220 is selected, the one or more processors 102 instruct the actuator 124 to recline the second row seat 220, and the second row seat 220 is reclined by the actuator 124. Similarly, when the driver 250 presses or touches the seat reclining button 620 while the second row seat 220 is selected, the one or more processors 102 instruct the actuator 124 to undo reclining the second row seat 220, and the second row seat 220 is returned to a more upright position by the actuator 124. The screen 108 may continue to show a real-time image captured by the camera 122. For example, in response to the operation of the seat reclining button 610, the second row seat 220 is reclined, and the real-time image is displayed on the screen 108 as shown in FIG. 6B.

The reclining operation by the actuator 124 may be disabled when an object is located proximately behind the selected seat. In embodiments, the location of the object may be detected by processing the image captured by the camera 122 and distinguishing seats or other components integrated into the vehicle from external objects such as human, pets, etc. In other embodiments, the object may be detected by the proximity sensor 116 or the pressure sensor 118. When the location of the object is detected to be proximate to the selected seat, the speaker 120 of the vehicle may provide an alarm sound in response to the press of the seat reclining button 610.

Figure 7:
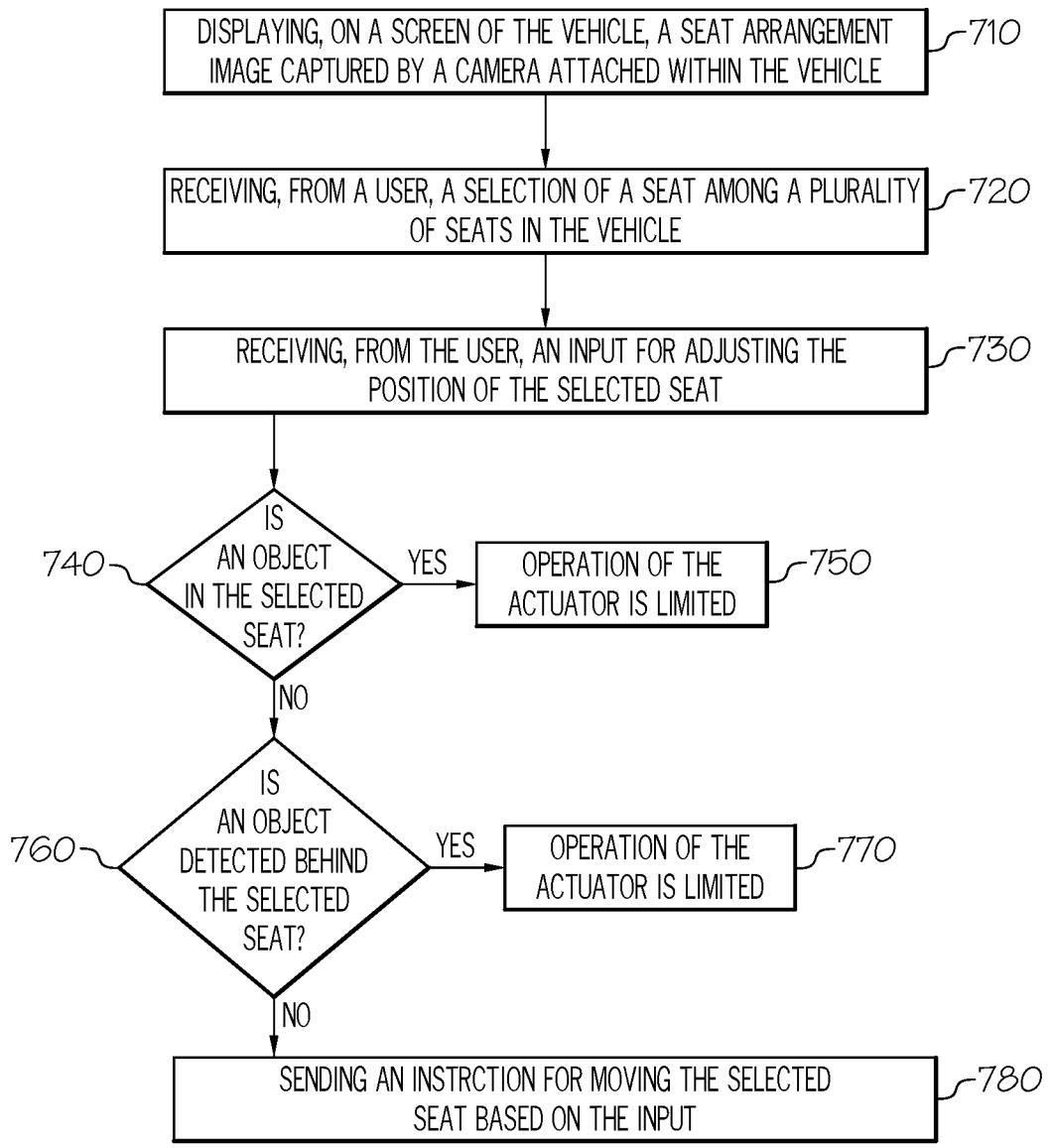
FIG. 7 is a flowchart of one method for adjusting seats in a vehicle in accordance with one or more embodiments shown and described herein.

FIG. 7 depicts a schematic flowchart representing a method for adjusting seats in a vehicle in accordance with one or more embodiments shown and described herein. In step 710, the vehicle seat adjustment system 100 displays, on the screen 108 of the vehicle, a seat arrangement image captured by a camera located within the vehicle. The seat arrangement image may be a side view of the seats or a top view of the seats as described above. In embodiments, the screen 108 may initiate displaying the seat arrangement image in response to an operation related to seat adjustment, for example, a press of a seat adjustment mode button, a press of the seat selection button 240, a press of the seat movement buttons 270 or 280, etc. For example, the screen 108 displays navigational information based on data from the satellite antenna, and switches the displayed content to the seat arrangement image when a driver presses the seat selection button 240. The seat arrangement image may show the driver 250 how much room remains for rearward or forward movement in real time. In addition, the driver 250 can identify the current status of seats by monitoring the seat arrangement image displayed on the screen 108.

In step 720, the vehicle seat adjustment system 100 receives a selection of a seat from a plurality of seats within the vehicle. For example, one of the first row seat 210, the second row seat 220, and the third row seat 230 is selected in response to a press of the seat selection button 240, and the selected seat may be highlighted on the screen 108. In other embodiments, more than one of the first row seat 210, the second row seat 220, and the third row seat 230 may be selected.

In step 730, the vehicle seat adjustment system 100 receives an input for adjusting the position of the selected seat. In embodiments, the one or more processors 102 of the vehicle seat adjustment system 100 receive a signal from one of the seat movement buttons 270 and 280 in response to the press of one of the seat movement buttons 270 and 280 by the driver 250. In some embodiments, the one or more processors 102 of the vehicle seat adjustment system 100 receive a signal from one of the seat folding button 510 and the seat unfolding button 520 in response to the press of one of the buttons 510 and 520 by the driver 250. In some embodiments, the one or more processors 102 of the vehicle seat adjustment system 100 receive a signal from one of the seat reclining button 610 and the seat reclining button 620 in response to the press of one of the buttons 610 and 620 by the driver 250.

In step 740, the vehicle seat adjustment system 100 determines whether an object is present in the selected seat. As described above, the object may be detected in various ways, by a processed image, the proximity sensor 116, the pressure sensor 118, etc. If it is determined that an object is present in the selected seat, the one or more processors 102 may limit the operation of the actuator 124 in step 750. For example, the one or more processors 102 may disable the folding operation of the actuator 124.

If it is determined that an object is not present in the selected seat, the one or more processors 102 may determine whether an object is detected behind the selected seat in step 760. An object behind the selected seat may be detected by the proximity sensor 116 or the pressure sensor 118. If it is determined that an object is present behind the selected seat, the one or more processors 102 may limit the longitudinal movement operation of the actuator 124 in step 770. For example, the one or more processors 102 may prevent an actuator from moving the selected seat rearward.

If it is determined that an object is not present behind the selected seat, the vehicle seat adjustment system 100 sends the actuator 124 an instruction for moving the selected seat based on the input in step 780. Then, the actuator 124 moves the selected seat based on the input. For example, the actuator 124 may move the selected seat in a longitudinal direction, in a lateral direction, or in a vertical direction in response to an input related to the press of the seat movement button 270 or 280. In another example, the actuator 124 may fold or unfold the selected seat in response to an input related to the press of the seat folding button 510 or the seat unfolding button 520. In another example, the actuator 124 may change an angular orientation of a seatback of the selected seat in response to an input related to the press of the seat reclining button 610 or the seat reclining 620. While the selected seat is moving, the screen 108 may display the movement of the selected seat in real time such that the driver 250 can see a space between seats and check whether any passenger is stuck between the seats. Once the movement of the selected seat is completed, the display mode of the screen 108 may return to a previous display mode, e.g., a navigation mode, an entertainment mode, etc.

Although not shown in FIG. 7, the one or more processors 102 may optionally disable movement by the actuator 124 under certain driving conditions. For example, when the transmission of the vehicle is in a driving mode, or the vehicle is driving at a speed greater than a certain threshold value, the one or more processors 102 may disable movement by the actuator 124 or disable displaying the seat arrangement on the screen 108. That is, the one or more processors 102 may enable the movement by the actuator 124 only when the transmission of the vehicle is in park or the vehicle is traveling at a speed below the certain threshold value.

It should be understood that embodiments described herein are directed to vehicle seat adjustment systems including one or more cameras that capture a seat arrangement image of the vehicle and a screen displaying the seat arrangement image. The vehicle seat adjustment systems described herein display, on a screen of the vehicle, a seat arrangement image captured by a camera attached within the vehicle, receive a selection of a seat among the one or more seats, receive an input for adjusting the position of the selected seat, and send to an actuator an instruction for moving the selected seat based on the input. By displaying a current seat arrangement image on the screen, the vehicle seat adjustment systems described allow passengers in the front seats to control the location and movement of seats behind the front seats safely and accurately.

It is noted that the terms "substantially" and "proximate" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat adjustment system, comprising:
a camera configured to capture a seat arrangement of a front seat of a vehicle and one or more seats behind the front seat;
a screen, communicatively coupled to the camera, configured to display the seat arrangement captured by the camera;
an input device configured to receive an input from a user for adjusting positions of the one or more seats;
one or more sensors configured to detect a presence of an object on the one or more seats;
an actuator communicatively coupled to the input device and configured to adjust positions of the one or more seats; and
a controller communicatively coupled to the camera, the screen, the input device and the actuator, the controller comprising at least one processor and at least one memory storing non-transitory computer readable and executable instructions that, when executed by the processors:
cause the captured seat arrangement to be displayed on the screen in response to a signal from the one or more sensors indicating that an object is present on the one or more seats;
receive the input from the input device; and instruct the actuator to adjust the positions of the one or more seats based on the input.

2. The vehicle seat adjustment system of claim 1, wherein the camera is located within the vehicle to capture a side view of the front seat of a vehicle and the one or more seats behind the front seat.

3. The vehicle seat adjustment system of claim 1, wherein the camera is located within the vehicle to capture a top view of the front seat of a vehicle and the one or more seats behind the front seat.

4. The vehicle seat adjustment system of claim 1,
wherein the non-transitory computer readable and executable instructions, when executed by the processor, receive a signal related to the presence of an object from the one or more sensors.

5. The vehicle seat adjustment system of claim 4, wherein the non-transitory computer readable and executable instructions, when executed by the processor, disable the actuator in response to a signal from the one or more sensors indicating that an object is proximate to the one or more sensors.

6. The vehicle seat adjustment system of claim 4, wherein the non-transitory computer readable and executable instructions, when executed by the processor, limit the adjustment of the actuator in response to a signal from the one or more sensors indicating that an object is proximate to the one or more sensors.

7. The vehicle seat adjustment system of claim 1, wherein the non-transitory computer readable and executable instructions, when executed by the processor, further cause the captured seat arrangement to be displayed on the screen in response to the input from the user.

8. The vehicle seat adjustment system of claim 1, wherein the one or more seats comprise a second row of seats behind the front seat and a third row of seats behind the second row of seats.

9. The vehicle seat adjustment system of claim 1, wherein the actuator is configured to move the one or more seats rearward or forward in response to the input from the user.

10. The vehicle seat adjustment system of claim 1, wherein the actuator is configured to move the one or more seats laterally in response to the input from the user.

11. The vehicle seat adjustment system of claim 1, wherein the actuator is configured to change an angular orientation of a seatback of the one or more seats with respect to a seating surface of the one or more seats in response to the input from the user.

12. The vehicle seat adjustment system of claim 1, wherein the input from the user comprises a selection of a seat among the one or more seats.

13. The vehicle seat adjustment system of claim 1, further comprising a speaker configured to provide an alarm in response to a signal from the one or more sensors indicating that an object is proximate to the one or more sensors.

14. The vehicle seat adjustment system of claim 1, wherein the camera includes an image processor configured to distinguish the one or more seats from an object on the one or more seats.

15. A method of adjusting positions of one or more seats located behind a first-row seat in a vehicle, the method comprising:
    displaying, on a screen of the vehicle, a seat arrangement image captured by a camera attached within the vehicle in response to a signal from one or more sensors indicating that an object is present on the one or more seats, the seat arrangement image including the one or more seats;
    receiving, from an input device located proximate to the first-row seat, a selection of a seat among the one or more seats;
    receiving, from the input device, an input configured to adjust a position of the selected seat; and
    sending, to an actuator communicatively coupled to the input device, an instruction configured to adjust the position of the selected seat based on the input.

16. The method of claim 15, further comprising:
    detecting an object on the selected seat; and
    disabling a folding operation of the selected seat in response to the detection of the object.

17. The method of claim 16, wherein the object is detected based on a change in current of the actuator.

18. The method of claim 15, further comprising:
    detecting an object behind the selected seat; and
    disabling the actuator to move the selected seat rearward.

19. The method of claim 15, further comprising:
    disabling the actuator when the vehicle is traveling at a speed greater than a predetermined value.

* * * * *